US008806336B2

(12) United States Patent
Miyazawa et al.

(10) Patent No.: US 8,806,336 B2
(45) Date of Patent: Aug. 12, 2014

(54) FACILITATING DISPLAY OF A MENU AND SELECTION OF A MENU ITEM VIA A TOUCH SCREEN INTERFACE

(75) Inventors: Yusuke Miyazawa, Tokyo (JP); Fuminori Homma, Tokyo (JP); Tomoya Narita, Kanagawa (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 235 days.

(21) Appl. No.: 12/821,399

(22) Filed: Jun. 23, 2010

(65) Prior Publication Data

US 2011/0004821 A1    Jan. 6, 2011

(30) Foreign Application Priority Data

Jul. 2, 2009    (JP) ................................. 2009-158153

(51) Int. Cl.
*G06F 3/0488*    (2013.01)
*G06F 3/0482*    (2013.01)
(52) U.S. Cl.
USPC ........................................................ 715/702
(58) Field of Classification Search
CPC .. G06F 3/0488; G06F 3/04883; G06F 3/0482
USPC ......................................... 715/702, 810, 764
See application file for complete search history.

(56) References Cited

U.S. PATENT DOCUMENTS

| | | | |
|---|---|---|---|
| 5,805,167 A * | 9/1998 | van Cruyningen | ........... 715/808 |
| 6,346,938 B1 | 2/2002 | Chan et al. | |
| 7,126,579 B2 | 10/2006 | Ritter | |
| 7,376,510 B1 | 5/2008 | Green | |
| 7,990,455 B2 | 8/2011 | Iga | |
| 8,245,156 B2 * | 8/2012 | Mouilleseaux et al. | ...... 715/834 |
| 8,316,324 B2 * | 11/2012 | Boillot | .......................... 715/863 |
| 8,549,432 B2 * | 10/2013 | Warner | ......................... 715/834 |
| 8,627,233 B2 * | 1/2014 | Cragun et al. | ................ 715/834 |
| 2008/0294332 A1 | 11/2008 | Levanon et al. | |

(Continued)

FOREIGN PATENT DOCUMENTS

| | | |
|---|---|---|
| EP | 1 921 419 A1 | 5/2008 |
| EP | 2 068 235 A2 | 6/2009 |

(Continued)

OTHER PUBLICATIONS

Rohs, M., Real-world interaction with camera phones, Nov. 8, 2004, In Ubiquitous Computing Systems. Second International Symposium, UCS 2004. pp. 74-89.*

(Continued)

*Primary Examiner* — Doug Hutton, Jr.
*Assistant Examiner* — Ashley Fortino
(74) *Attorney, Agent, or Firm* — Wolf, Greenfield & Sacks, P.C.

(57) ABSTRACT

There is provided an information processing apparatus including an operating tool detector for detecting a touch state of an operating tool with a display panel; a display controller for, when change of a pointing direction of the operating tool is detected by the operating tool detector on an object selected on the display panel, controlling the display panel to display near the object an operation menu containing one or more operation items I selectable for the object; and an operation item selecting portion for, when the operation menu is displayed, selecting one of the operation items in accordance with the change in the pointing direction of the operating tool detected by the operating tool detector from the operation menu.

8 Claims, 11 Drawing Sheets

(56) References Cited

U.S. PATENT DOCUMENTS

| | | | |
|---|---|---|---|
| 2008/0313538 A1* | 12/2008 | Hudson | 715/702 |
| 2009/0281720 A1 | 11/2009 | Jakobson | |
| 2010/0077354 A1* | 3/2010 | Russo | 715/834 |
| 2010/0079373 A1* | 4/2010 | Ohnishi | 345/157 |
| 2010/0079405 A1* | 4/2010 | Bernstein | 345/174 |
| 2011/0001628 A1 | 1/2011 | Miyazawa et al. | |

FOREIGN PATENT DOCUMENTS

| | | | |
|---|---|---|---|
| GB | 2451274 B | * | 3/2013 |
| JP | 2004-037125 A | | 2/2004 |
| JP | 2004-233333 A | | 8/2004 |
| JP | 2005-352619 | | 12/2005 |
| JP | 2007-080291 | | 3/2007 |
| JP | 2007-226571 | | 9/2007 |
| JP | 2009-025041 A | | 2/2009 |

* cited by examiner

FACILITATING DISPLAY OF A MENU AND SELECTION OF A MENU ITEM VIA A TOUCH SCREEN INTERFACE

BACKGROUND OF THE INVENTION

1. Field of the Invention

The present invention relates to an information processing apparatus and an information processing method.

2. Description of the Related Art

There is known an information processing apparatus that detects movement of an operating tool such as a finger of a user on a display panel and performs interaction with the user. For example, when the user selects a desired GUI (Graphical User Interface) object on the display panel, the information processing apparatus displays an operation menu containing one or more operation items selectable for the object and asks the user to select a desired operation item. Then, when the operating tool is in touch with a display area of the object for a predetermined time period, the information processing apparatus recognizes input of the menu starting operation and displays the operation menu.

[Patent Document 1] Japanese Patent Application Laid-Open No. 2005-352619

[Patent Document 2] Japanese Patent Application Laid-Open No. 2007-80291

[Patent Document 3] Japanese Patent Application Laid-Open No. 2007-226571

However, the user has to keep a touch state of an operating tool for a predetermined time period until the operation menu is displayed. Here, when the predetermined period is shortened, it is ambiguous to discriminate between the general object selecting operation (tapping) and the menu starting operation. Besides, after the operation menu is displayed, the user needs to perform complicated operation to select the desired operation item, and it may not be necessarily said that the user can enjoy a favorable operation environment.

Particularly, in the information processing apparatus such as a portable information processing terminal with restricted I/O interface specifications or the like, the user needs to perform very many operations including selecting an option menu after selecting the object. In addition, in displaying the operation menu after selection of a plurality of objects and selecting a desired operation item, the user also needs to perform the complicated operation.

In light of the foregoing, it is desirable to provide an information processing apparatus and an information processing method capable of facilitating display of an operation menu for an object and selection of an operation item.

According to a first embodiment of the present invention, there is provided an information processing apparatus including an operating tool detector for detecting a touch state of an operating tool with a display panel, a display controller for, when change of a pointing direction of the operating tool is detected by the operating tool detector on an object selected on the display panel, controlling the display panel to display near the object an operation menu containing one or more operation items selectable for the object, and an operation item selecting portion for, when the operation menu is displayed, selecting one of the operation items in accordance with the change in the pointing direction of the operating tool detected by the operating tool detector from the operation menu.

The operation item selecting portion may select the operation item on an extension of the pointing direction of the operating tool from the operation menu.

The operation item selecting portion may select the operation item placed in a direction defined by a change amount obtained by multiplying a change amount of the pointing direction of the operating tool by a coefficient a, the coefficient a being larger than 1, from the operation menu. The display controller may control the display panel to rotate the operation menu by a change amount obtained by multiplying the change amount of the pointing direction of the operating tool by a coefficient (1−a) and then, display the operation menu.

When the operation menu is displayed and simultaneously a non-touch state of the operating tool is detected by the operating tool detector, the operation item selected by the operation item selecting portion may be executed.

When the operation menu is displayed and simultaneously, movement of a predetermined distance or more of the operating tool in touch with the display panel is detected by the operating tool detector, the display controller may control the display panel to stop display of the operation menu.

According to a second embodiment of the present invention, there is provided an information processing method, including the steps of when change in a pointing direction of an operating tool is detected on an object selected on a display panel, controlling the display panel to display, near the object, an operation menu containing one or more operation items selectable for the object, and when the operation menu is displayed, selecting one of the operation items in accordance with the change of the pointing direction of the operating tool from the operation menu.

According to the embodiments of the present invention described above, it is possible to provide an information processing apparatus and an information processing method capable of facilitating display of an operation menu for an object and selection of an operation item.

DETAILED DESCRIPTION OF THE EMBODIMENT(S)

Figure 1:
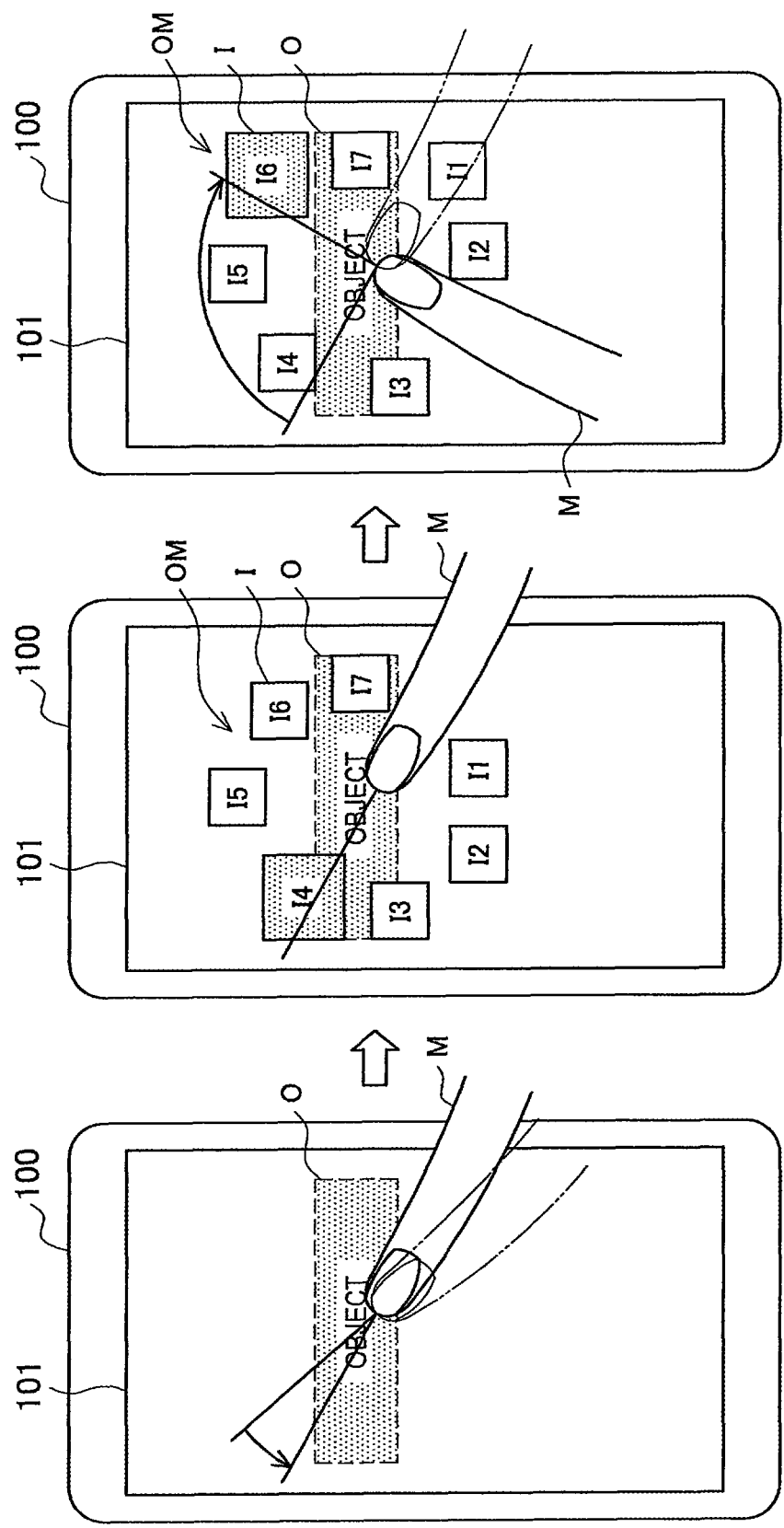
FIG. 1 is a view illustrating an overview of an information processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[1. Overview of Information Processing Apparatus 100]

FIG. 1 is a view illustrating an overview of an information processing apparatus 100 according to an embodiment of the present invention.

The information processing apparatus 100 according to the embodiment of the present invention detects a touch state of an operating tool M such as a user finger with a display panel 101. The information processing apparatus 100 is a personal computer, a PDA, a portable music player or the like. In the following description, the information processing apparatus 100 has a built-in type display panel 101, however, the information processing apparatus 100 may be connected to a display panel 101 via communication means.

When change in a pointing direction of the operating tool M is detected on an object O selected on the display panel 101, the information processing apparatus 100 controls the display panel 101 in such a manner that an operation menu OM containing one or more operation items I selectable for the object O is displayed near the object O. Then, while the operation menu OM is displayed, the information processing apparatus 100 selects an operation item I in accordance with change in the pointing direction of the operating tool M from the operation menu OM.

For example, in FIG. 1, while the object O is selected, the pointing direction of the operating tool M is changed on the object O and the operation menu OM is displayed. In accordance with the change of the pointing direction of the operating tool M on the operation menu OM, the operation item I (for example, operation item 16) is selected. Here, the pointing direction of the operating tool is a direction pointed out by a finger, for example, when the operating tool is the finger. In FIG. 1 and other figures, the operation item I and object O selected are illustrated hatched.

Accordingly, a user can input a menu starting operation by changing the pointing direction of the operating tool M and the user does not need to keep the touch state of the operating tool M for a predetermined time period. Besides, the user can select a desired operation item I by changing the pointing direction of the operating tool M, and the user does not need to perform complicated operation in selecting of the operation item I. Further, the user can perform operations of selecting an object O, displaying an operation menu OM and selecting an operation item I as a series of the operations efficiently.

[2. Functional Structure of Information Processing Apparatus 100]

Figure 2:
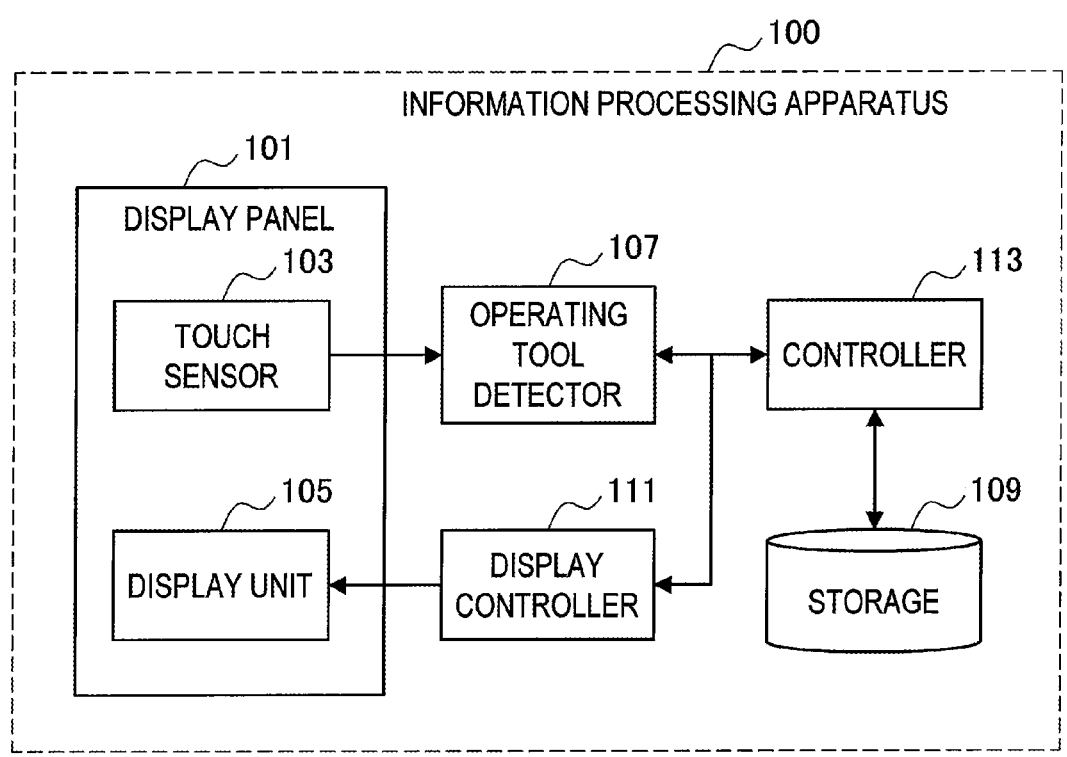
FIG. 2 is a block diagram illustrating a principal functional structure of the information processing apparatus according to the embodiment of the present invention.

FIG. 2 is a block diagram illustrating a principal functional structure of the information processing apparatus 100 according to the embodiment of the present invention. The information processing apparatus 100 has the display panel 101, an operating tool detector 107, a storage 109, a display controller 111 and a controller 113.

The display panel 101 functions as a touch sensor 103 and a display unit 105. The touch sensor 103 detects a touch state of the operating tool M. The touch sensor 103 is an optical sensor, an electric capacitance sensor, a pressure sensor or any other sensor. In the following description, it is assumed that the touch sensor 103 detects the touch state of the operating tool M based on a light-receiving state of the display panel 101.

The display unit 105 displays processing results of applications, contents and an object O under control of the display controller 111 and particularly displays an operation menu OM containing one or more operation items I selectable for the object O selected on the display panel 101. Here, the object is an object O that includes GUI, such as an icon, a button or a thumbnail.

The operating tool detector 107 detects the touch state of the operating tool M with the display panel 101 by the touch sensor 103. The operating tool detector 107 uses the light-receiving state of the display panel 101 as a basis to detect presence or absence of touch of the operating tool M with the display panel 101, a touch position, a touch area and a pointing direction. Here, the method of detecting the operating tool M by the touch sensor 103 will be described later.

The storage 109 stores information processing programs, application program, object O data and the like and particularly stores data of the operation menu OM. The controller 113 controls the overall operation of the information processing apparatus 100 by controlling each portion by execution of an information processing program.

Particularly, the controller 113 has a function as an operation item selecting portion to select an operation item I from the operation menu OM in accordance with change in the pointing direction of the operating tool M detected by the operating tool detector 107 while the operation menu OM is displayed.

Here, change in the pointing direction of the operating tool M can be discriminated from conventional button down, button up, click, double click, touch, drag, drop, flick and the like. It is detected without interference with these operations.

[3. Method for Detecting the Operating Tool M]

On the display panel 101, RGB pixels and light-receiving sensors (both not shown) are arranged in a matrix. The light-receiving sensors function as the touch sensor 103 to receive light emitted from the display panel 101 and reflected by the operating tool M and detect the touch state of the operating tool M based on the light-receiving state. The operating tool detector 107 performs digital processing on an output result of the touch sensor 103 thereby to generate a sensor image S.

The operating tool detector 107 calculates a luminance value expressing the light-receiving state corresponding to each pixel based on the sensor image S, and processes the luminance value into a binary value with use of a predetermined threshold. In the binary processing, the luminance value of each pixel is classified into first or second category, and each area of the sensor image S is classified into first or second area A1 or A2 corresponding to respective categories. The first and second areas A1 and A2 correspond to the large and small luminance areas, which are specified as a touch area and a non-touch area of the operating tool M, respectively.

The operating tool detector 107 uses existence of the first area A1 as a basis to detect presence or absence of touch of the operating tool M with the display panel 101. Besides, the operating tool detector 107 calculates the center-of-gravity position and area of the first area A1 thereby to detect each of the touch position and touch area of the operating tool M.

Particularly, the operating tool detector 107 specifies a long axis direction D of the first area A1 thereby to detect the pointing direction of the operating tool M. The pointing direction of the operating tool M is defined as a direction of pointing out an upper part of the display panel 101 along the long axis direction D of the first area A1. The controller 113 calculates an angle difference between pointing directions of the operating tool M before and after rotation thereby to calculate the rotational angle of the operating tool M.

Figure 3A:
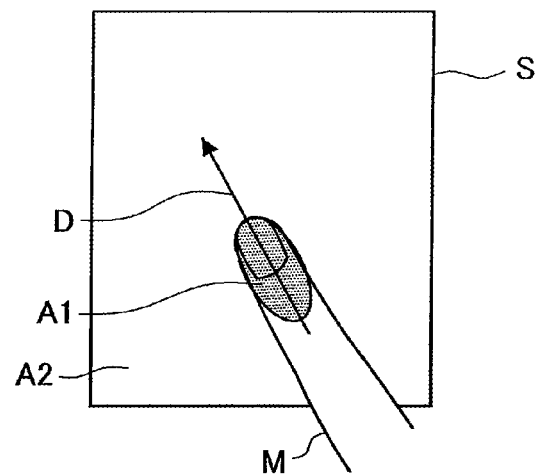
FIG. 3A is a view illustrating a detection result of an operating tool and a position of the operating tool on a display panel.
Figure 3B:
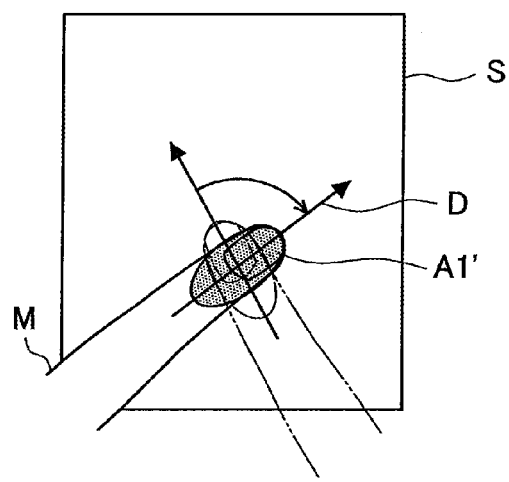
FIG. 3B is a view illustrating a detection result of an operating tool and a position of the operating tool on a display panel.
Figure 3C:
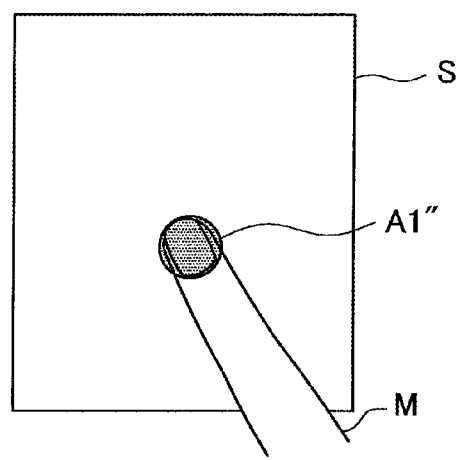
FIG. 3C is a view illustrating a detection result of an operating tool and a position of the operating tool on a display panel.

Hereinafter, the method for detecting the pointing direction of the operating tool M will be described with reference to FIGS. 3A to 3C. FIGS. 3A to 3C are views illustrating detection results of the operating tool M and positions of the operating tool M on the display panel 101.

In FIG. 3A, the touch area A1 of a finger end as the operating tool M is grasped as an elliptic area A1 on a sensor image S. In this case, the operating tool detector 107 specifies the long axis direction D of the elliptic area A1 and detects as the pointing direction of the operating tool M a direction of pointing the upper part of the display panel 101 along the specified long axis direction D. Usually, the touch area A1 of the finger end with the display panel 101 is grasped as an elliptic area A1 in which the pointing direction of the finger is the long axis direction D.

In FIG. 3B, the finger end is rotated from the state of FIG. 3A and a touch area A1' of the rotated finger end is grasped as an elliptic area A1' on the sensor image S. In this case, the operating tool detector 107 specifies the long axis direction D of the elliptic area A1' and detects the direction of pointing the upper part of the display panel 101 along the specified long axis direction D as a pointing direction of the operating tool M after rotation. Then, the controller 113 uses an angle difference between pointing directions of the operating tool M before and after rotation as a basis to calculate the rotational angle of the operating tool M.

On the other hand, in FIG. 3C, a touch area A1" of the finger end is grasped as an approximately circular area A1" on the sensor image S. In this case, the operating tool detector 107 may not specify the long axis direction D of the touch area A1" and the controller 113 regards it as a detection error.

[4. Information Processing Method]

Figure 4:
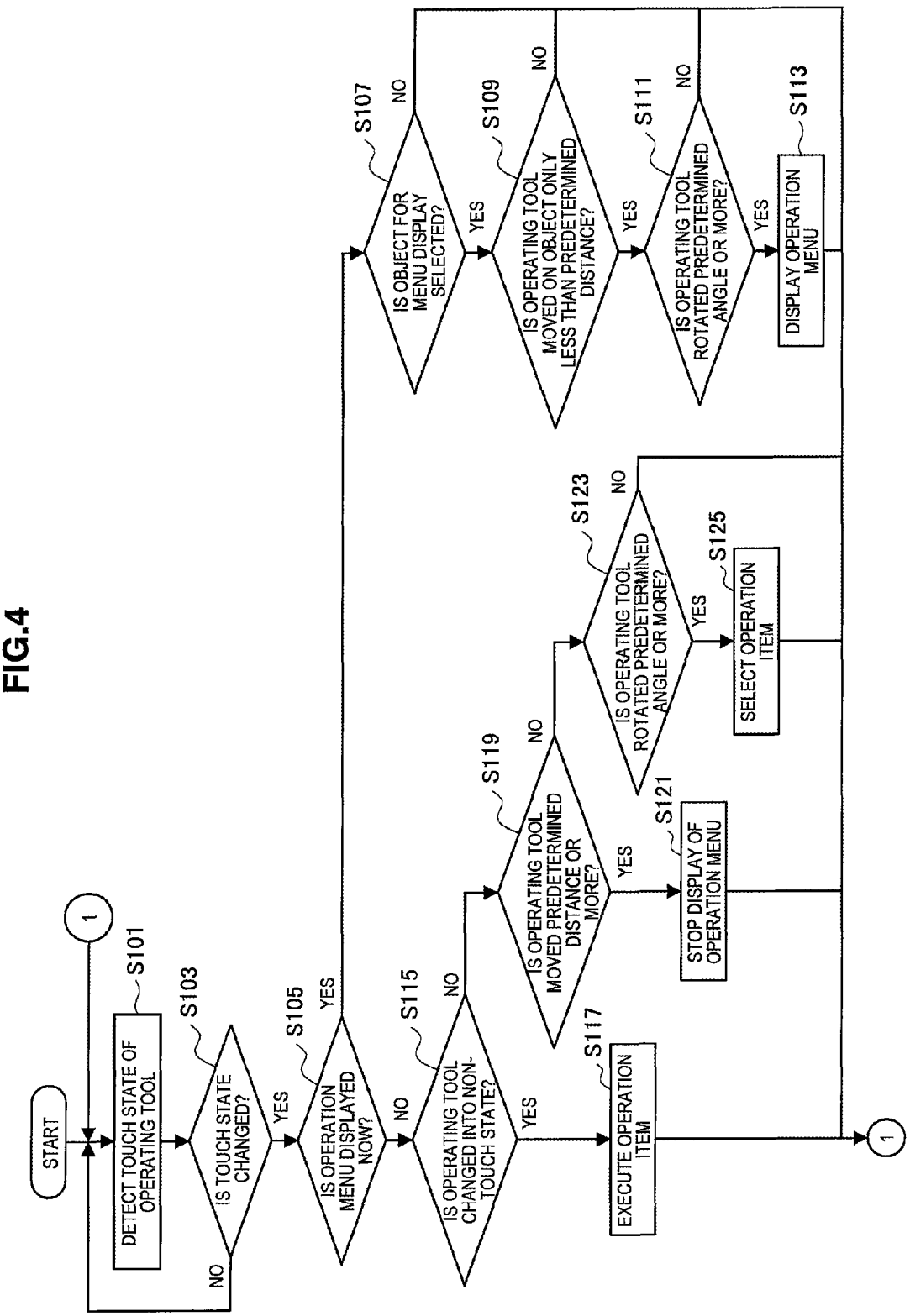
FIG. 4 is a flowchart illustrating an information processing method according to an embodiment of the present invention.

FIG. 4 is a flowchart illustrating an information processing method according to an embodiment of the present invention. FIGS. 5 to 8 are views illustrating processing examples of the information processing method.

As illustrated in FIG. 4, the operating tool detector 107 detects a touch state of the operating tool M for each detection frame (S101). The controller 113 determines whether or not the touch state of the operating tool M is changed from that in the last detected frame (S103). When the determination result is positive, the controller 113 performs the processing of step S105 and later, while when the determination result is negative, it goes back to the processing of step S101.

In step S105, the controller 113 determines whether or not the operation menu OM is displayed. When the determination result is positive, the controller 113 performs the processing of step S107 and later. When the determination result is negative, it performs the processing of step S115.

In step S107, the controller 113 determines whether or not the object O for display of the operation menu is selected on the display panel 101. The object O is selected on the display panel 101 by tapping of the operating tool M or the like. When the determination result is positive, the controller 113 determines whether or not the operating tool M is not moved predetermined distance or more on the selected object O and the operating tool M is rotated a predetermined angle or more (S109, S111).

Here, a moving distance of the operating tool M is a change amount of the touch position of the operating tool M that has moved in touch with the display panel 101. The rotational amount of the operating tool M means a change amount of the pointing direction of the operating tool M. Besides, movement for a predetermined distance or more means, for example, movement of the selected object O to the outside of display area. Rotation by a predetermined angle or more means, for example, rotation by such a rotational angle that input of the menu starting operation is not misidentified.

Then, when the determination result is positive, the controller 113 displays the operation menu OM (S113) and goes back to the processing of step S101. On the other hand, when the determination result in step S107, S109 or S111 is negative, the controller 113 goes back to the processing of step S101.

Here, the operation menu OM contains one or more operation items I selectable for the selected object O, which are displayed near the object O. In the operation menu OM, a selected operation item I is brought into focus and, for example, the operation item I is displayed enlarged. Besides, the operation menu OM is displayed in consideration of the position of the operating tool M estimated from the pointing direction of the operating tool M so as to prevent the displayed operation item I from being covered with the operating tool M to reduce the visibility.

Figure 5:
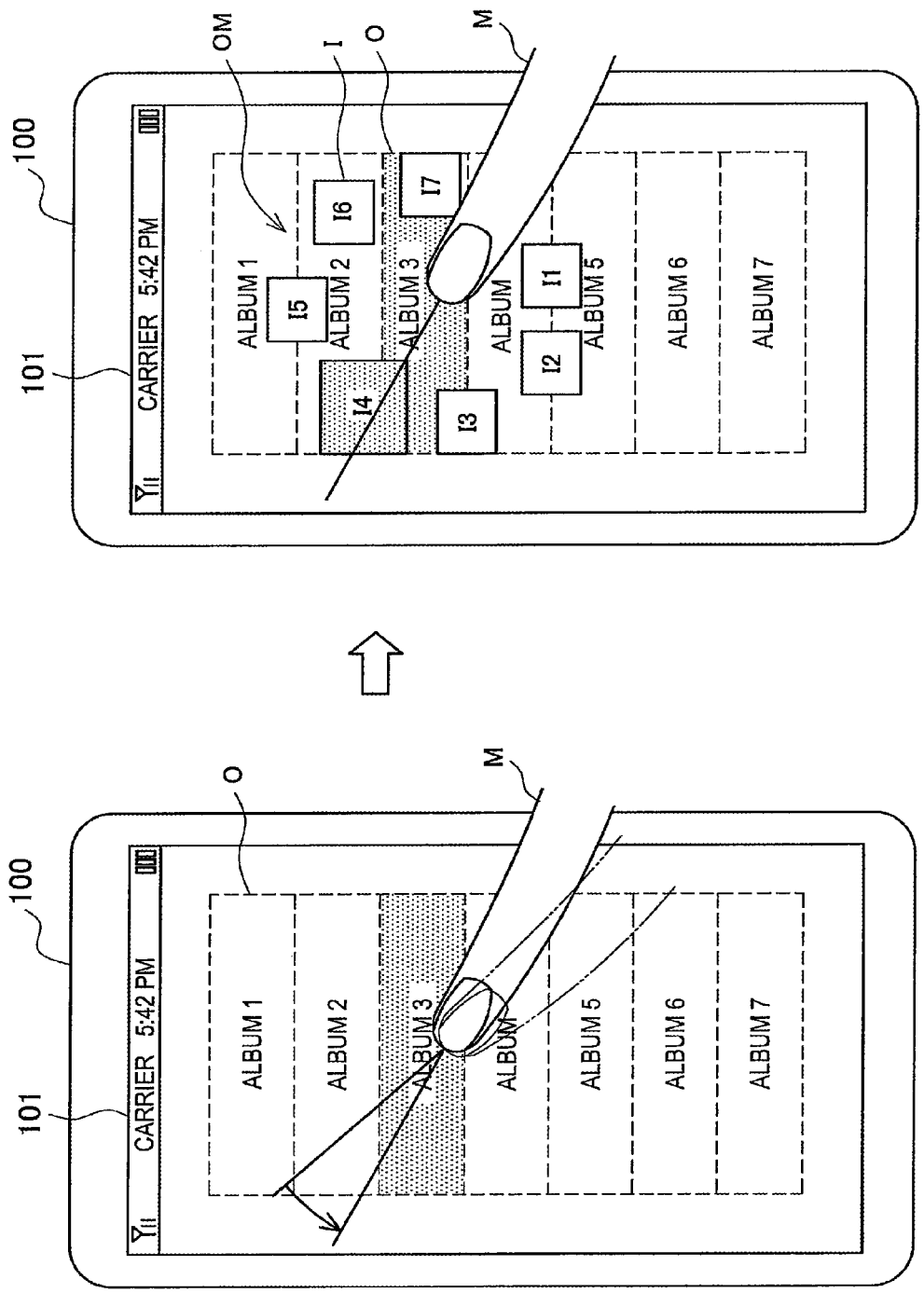
FIG. 5 is a view illustrating a processing example by the information processing method (display of an operation menu)

In FIG. 5, labels of music albums 1 to 7 are displayed on the display panel 101 as objects O and the label of album 3 is selected by the operating tool M. As illustrated in FIG. 5, when the object O is selected and the operating tool M is rotated a predetermined angle or more, input of the menu starting operation is recognized and the operation menu OM is displayed. In FIG. 5, the operation menu OM containing the operation items I for selecting from songs 1 to 7 stored in the album 3 is displayed. Besides, the operation item I4 on an extension of the pointing direction of the operating tool M is selectable on the operation menu OM. Here, when the operating tool M is moved a predetermined distance or more, the input of the menu starting operation is not recognized to prevent operation mistake. With this structure, the user can input the menu starting operation easily by changing the pointing direction of the operating tool M.

When the determination result in step S105 is negative, that is, the operation menu OM is displayed, the controller 113 determines in step S115 whether or not the operating tool M is changed into non-touch state. Then, when the determination result is positive, the controller 113 executes the operation item I selected on the operation menu OM (S117), and it goes back to step S101. When the determination result is negative, the processing of step S119 is performed.

Figure 6:
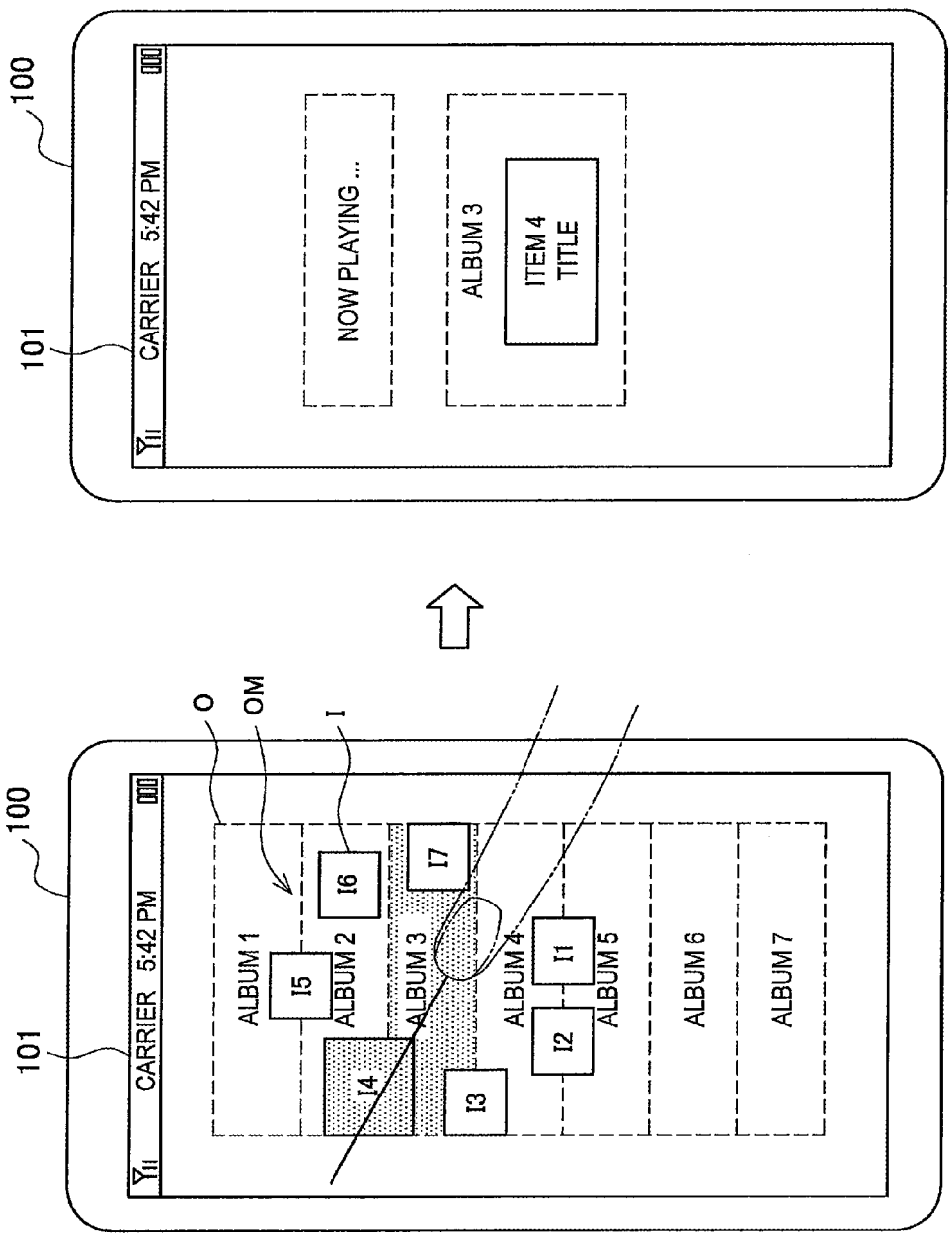
FIG. 6 is a view illustrating a processing example by the information processing method (execution of an operation item)

As shown in FIG. 6, the operation item I selected on the operation menu OM is executed by changing the operating tool M into the non-touch state while the operation menu OM is displayed. In FIG. 6, once the operating tool M is changed into the non-touch state, replay of the operation item I4 selected on the operation menu OM is started. Then, the user can easily instruct execution of the operation item I by bringing the operating tool M into the non-touch state.

When the determination result in step S115 is negative, that is, the operating tool M is not changed into the non-touch state, then, in step S119, the controller 113 determines whether or not the operating tool M is moved a predetermined distance or more. Here, movement of a predetermined distance or more means, for example, movement to the outside of the display area of the operation menu OM. Then, when the determination result is positive, display of the operation menu OM is stopped (S121), and it goes back to step S101. When the determination result is negative, the processing of step S123 is performed.

Figure 7:
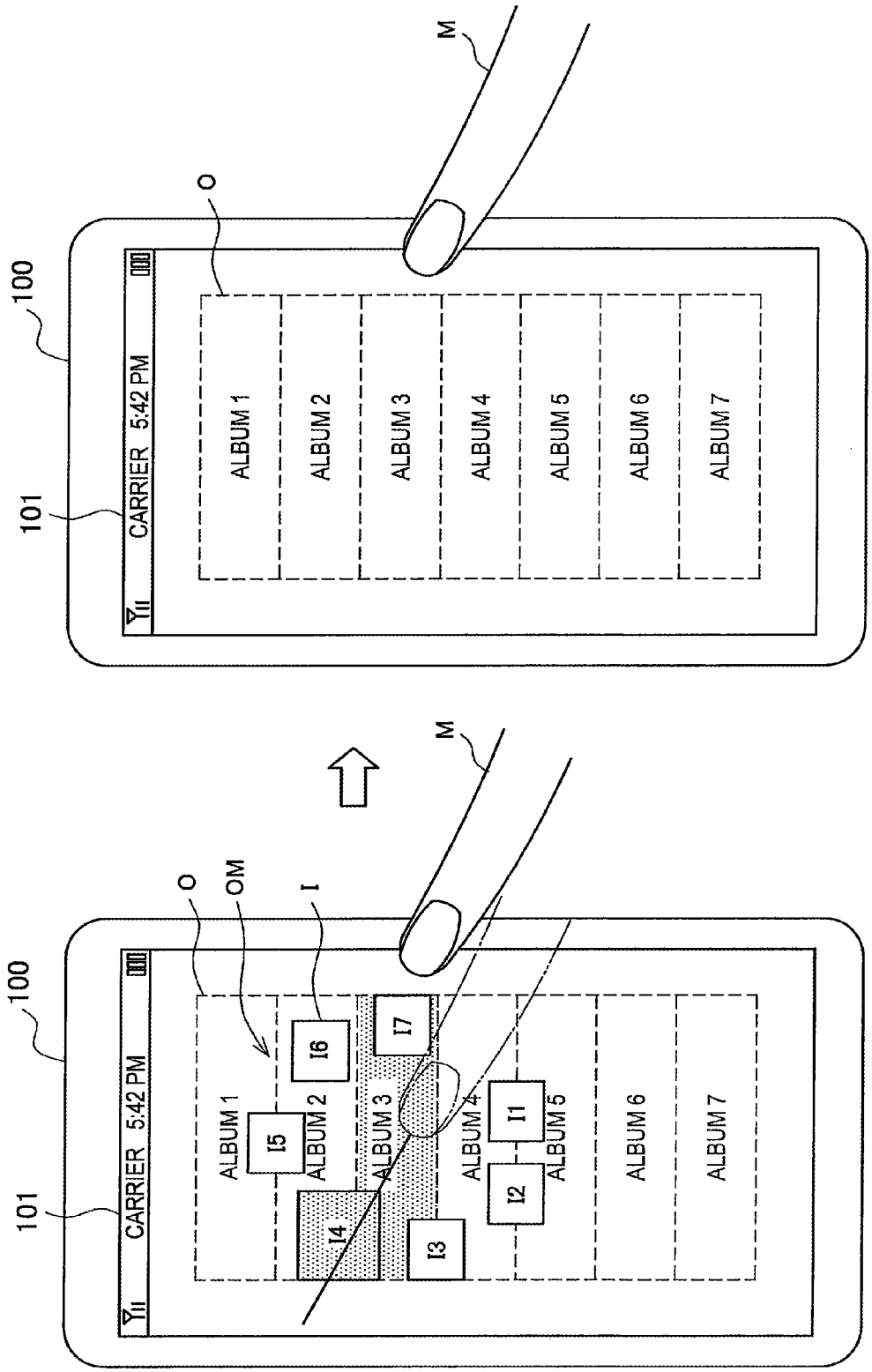
FIG. 7 is a view illustrating a processing example by the information processing method (stop of display of the operation menu)

As illustrated in FIG. 7, display of the operation menu OM is stopped by the operating tool M that has moved a predetermined distance or more while the operation menu OM is displayed. In FIG. 7, once the operating tool M is moved outside the display area of the object O of the selected album 3, display of the operation menu OM is stopped. With this structure, the user can easily stop display of the operation menu OM by moving the operating tool M a predetermined distance or more.

When the determination result in step S119 is negative, that is, the operating tool M is not moved a predetermined distance or more, the controller 113 determines whether or not the operating tool M is rotated a predetermined angle or more (S123). Here, rotation by a predetermined angle or more means, for example, rotation of the pointing direction of the operating tool M with a detection accuracy or more. Then, when the determination result is positive, selection of the operation item I is performed (S125) and display of the operation menu OM and the like are updated. Further, the controller 113 returns back to the processing of step S101.

Figure 8:
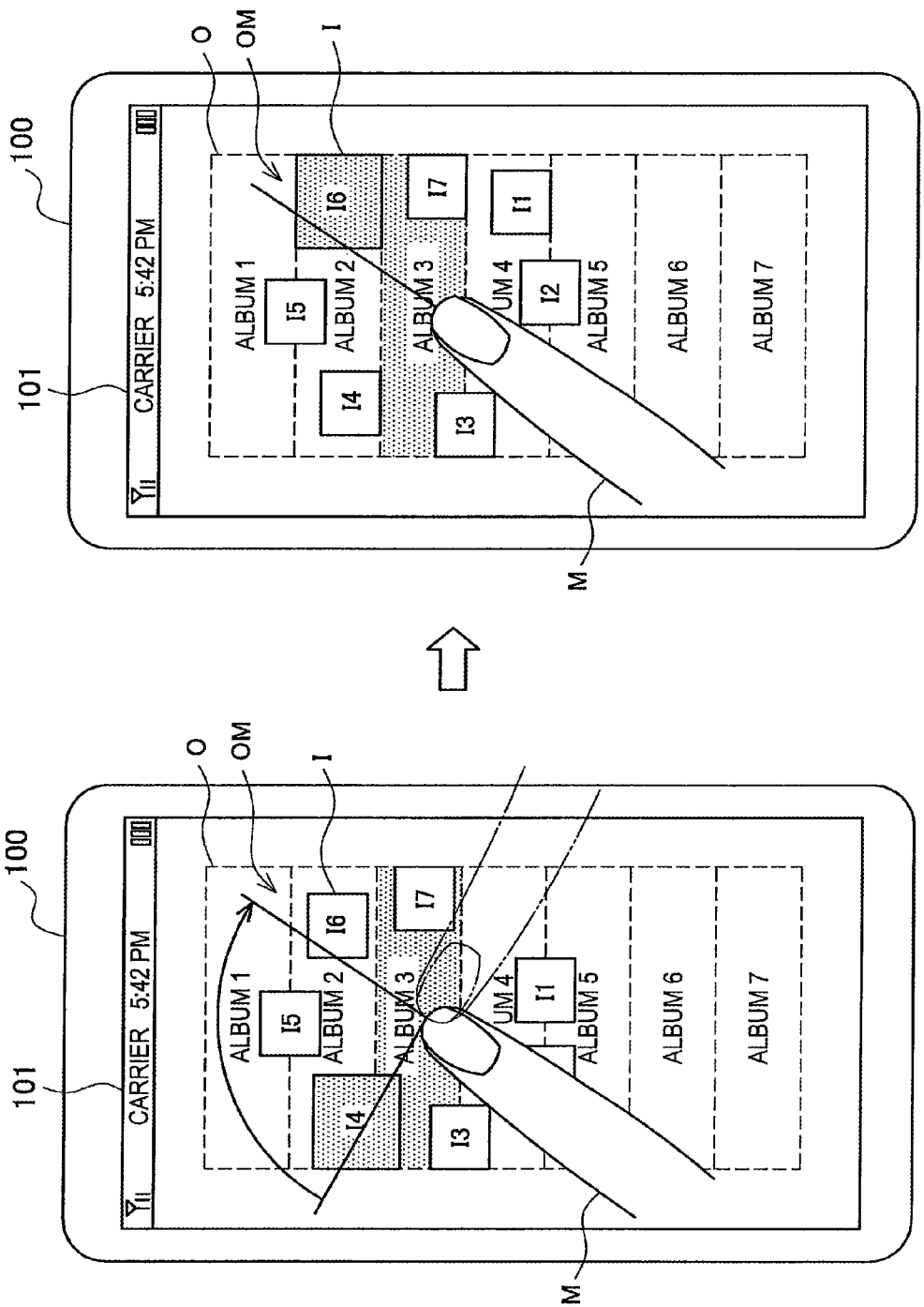
FIG. 8 is a view illustrating a processing example by the information processing method (selection of an operation item)

As illustrated in FIG. 8, the operation item I is selected in accordance with change in the pointing direction of the operating tool M while the operation menu OM is displayed. Then, on the operation menu OM, the focus is moved to the selected operation item I. In FIG. 8, when the pointing direction of the operating tool M is rotated 90° clockwise, the focus is moved from the operation item I4 to the operation item I6 placed in the 90° clockwise direction. Here, out of the operation items I contained in the operation menu OM, the operation item I placed on the extension of the pointing direction of the operating tool M on the display panel 101 is selected. Then, the user can easily select the desired operation item I in accordance with the change in the pointing direction of the operating tool M. Here, when display of the operation menu OM is started, predetermined operation items I may be set to be selectable or all of them may be set to be unselectable.

[5. Modifications]

Figure 9:
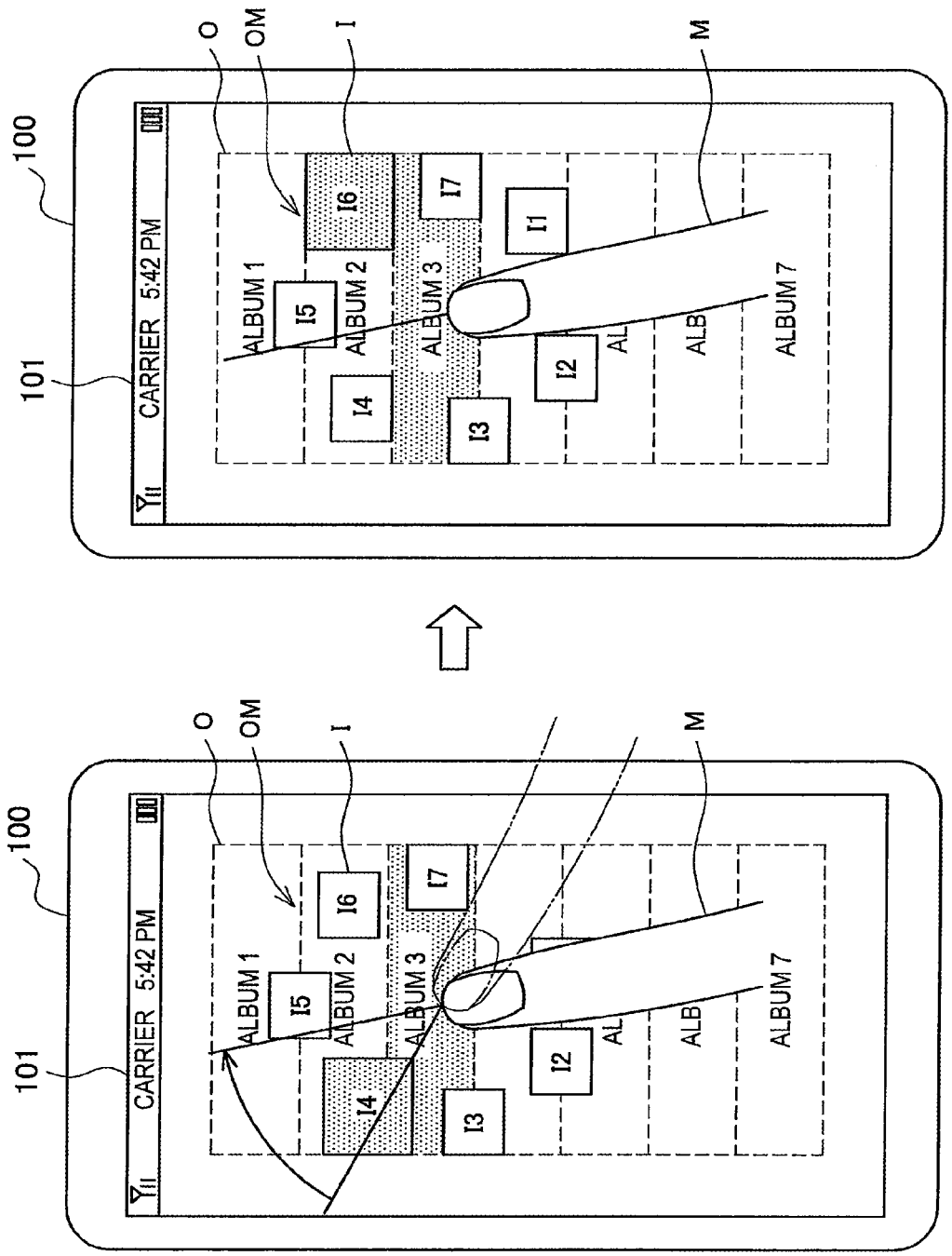
FIG. 9 is a view illustrating a first modification for selection of operation item.
Figure 10:
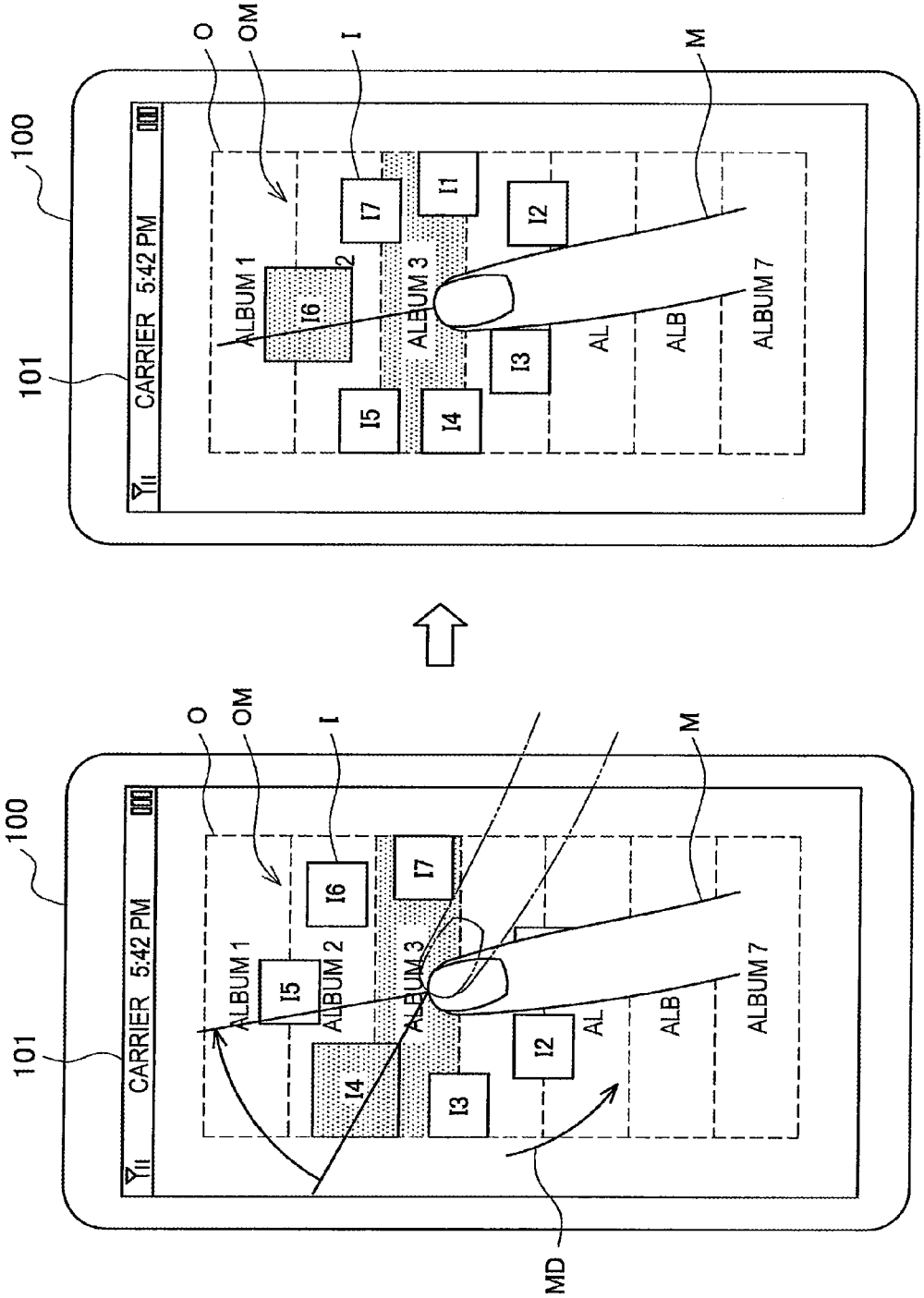
FIG. 10 is a view illustrating a second modification for selection of operation item.
Figure 11:
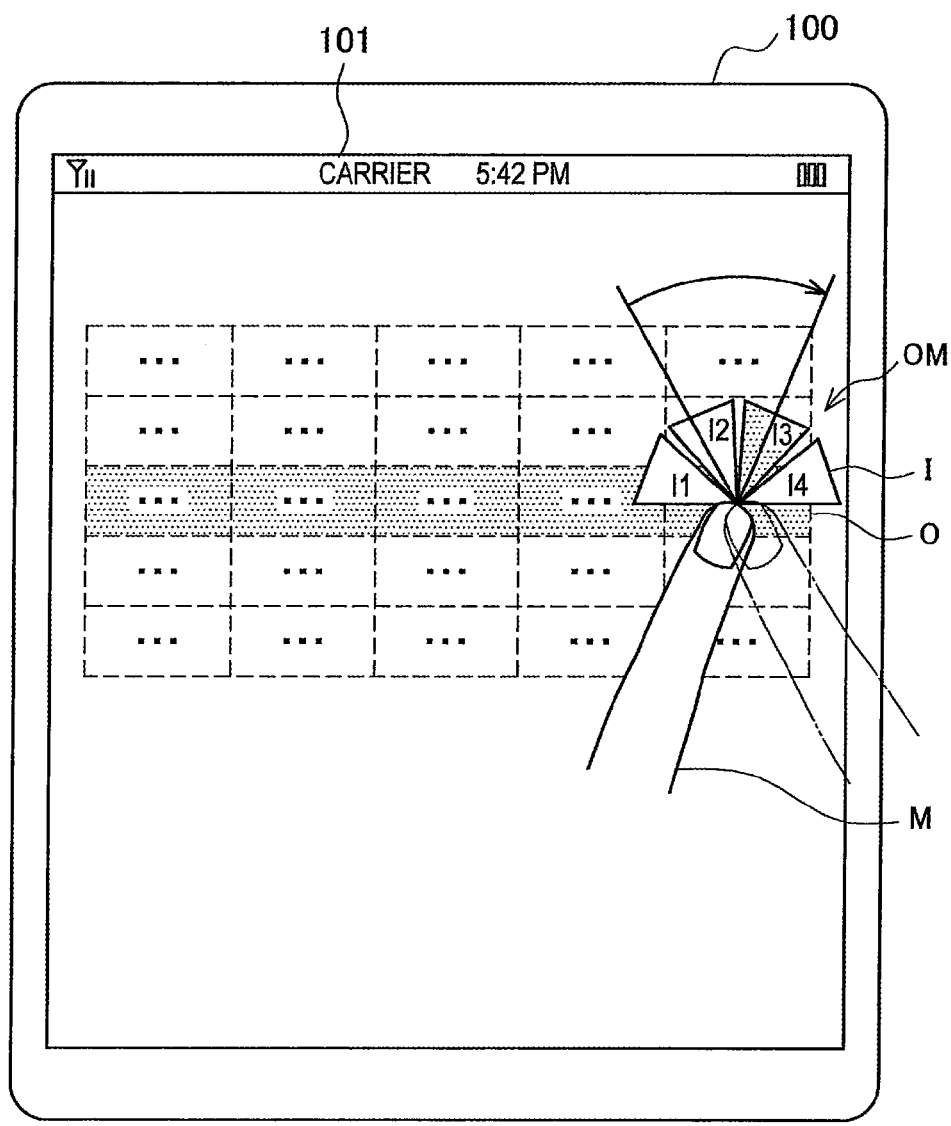
FIG. 11 is a view illustrating another display example of the operation menu.

FIGS. 9 and 10 are views illustrating first and second modifications for selecting an operation item I. FIG. 11 is a view illustrating another display example of the operation menu OM.

In the above-mentioned embodiment, a case in which the operation item I is selected on the extension of the pointing direction of the operating tool M is described. In this case, the change range of the pointing direction of the operating tool M is restricted and sometimes the operability in selection is reduced. For example, there is some difficulty in rotating the pointing direction of the finger 180°.

Therefore, as illustrated in FIG. 9, in the first modification, selected is not the operation item I on the extension of the pointing direction of the operating tool M but the operation item I in the direction defined by a change amount obtained by multiplying a change amount of the pointing direction of the operating tool M by a coefficient a (1<a).

For example, it is assumed that the pointing direction of the operating tool M is rotated 45° clockwise while the operation item I4 on the extension of the pointing direction of the operating tool M is selected. In this case, for example, when the coefficient a=2 is given, a focus is moved to the operation item I6 placed in the 90° clockwise direction (=45 degree×2) from the selected operation item I4 on the operation menu OM and the operation item I6 is selected. With this structure, the user can easily select a desired operation item I as compared with selecting of the operation item I on the extension of the pointing direction of the operating tool M.

In the first modification, a case in which the operation item I is selected that is placed in the direction defined by a change amount obtained by multiplying a change amount of the pointing direction of the operating tool M by a coefficient a is described. In this case, as the operation item is selected by highly valuing the change of the pointing direction of the operating tool M, the operability in selection is improved as compared with selecting of the operation item I on the extension of the pointing direction. However, as the position of the selected operation item I does not match the pointing direction of the operating tool M (for example, in FIG. 9, not the operation item I6 but the operation item I5 is positioned on the extension of the pointing direction of the operating tool M), it is difficult to select the operation item I by an intuitive operation.

Therefore, as illustrated in FIG. 10, in the second modification, an operation item I is selected that is placed in the direction defined by a change amount obtained by multiplying a change amount of the pointing direction of the operating tool M by a coefficient a (1<a), and the operation menu OM is rotated by a change amount obtained by multiplying the change amount of the pointing direction of the operating tool M by a coefficient (1−a).

For example, it is assumed that the pointing direction of the operating tool M is rotated 45° clockwise while the operation item I4 is selected on the extension of the pointing direction of the operating tool M. In this case, for example, when the coefficient a=2 is given, a focus is moved to the operation item I6 placed in the 90° clockwise direction (=45°×2) from the operation item I4 on the operation menu OM, and as illustrated by the arrow MD, the operation menu OM is rotated clockwise by −45° (=45°×(−1)), that is, counterclockwise by 45°. Then, the operation item I6 on the extension of the pointing direction of the operating tool M is selected. With this structure, the user can easily select the desired operation item I by the intuitive operation as compared with selecting of the operation item I placed in the direction defined by the change amount obtained by multiplying the change amount of the pointing direction of the operating tool M by the coefficient a.

FIG. 11 illustrates a display example of the operation menu OM containing one or more operation items I selectable for a plurality of objects O. In FIG. 11, for example, statistical process of maximum, minimum, average, sum and the like is performed on data contained in a plurality of cells that form a spread sheet (object O).

In this case, the user performs dragging of the operating tool M on the display panel 101 to select a plurality of cells containing data for statistical process, and then, rotates the operating tool M on the cell at the dragging end by a predetermined angle or more. Then, the controller 113 recognizes input of the menu starting operation and displays an approximately sector-shaped operation menu OM around the cell at the end. Then, following the menu starting operation, the user can select the operation item I in accordance with change in the pointing direction of the operating tool M (for example, in FIG. 11, the operation item I3 is selected).

Here, if the pointing direction of the operating tool M is slightly changed during dragging of the operating tool M, the controller 113 does not recognize input of the menu starting operation as long as the change in the pointing direction is less than a predetermined angle.

[6. Conclusion]

As described above, according to the embodiments of the present invention, when change in the pointing direction of the operating tool M is detected on the object O selected on the display panel 101, the information processing apparatus 100 controls the display panel 101 (display unit 105) to display the operation menu OM containing one or more operation items I selectable for the object O near the object O. Then, the information processing apparatus 100 selects an operation item I on the operation OM in accordance with the change in the pointing direction of the operating tool M while the operation menu OM is displayed.

With this structure, the user can input a menu starting operation by changing the pointing direction of the operating tool M, and does not need to keep the touch state of the operating tool M for a predetermined time period. Besides, the user can select a desired operation item I by changing the pointing direction of the operating tool M and does not need to perform a complicated operation in selecting of the operation item I. Further, the user can perform operations of selecting of the object O, displaying of the operation menu OM and selecting of the operation item I as a series of the operations efficiently.

It should be understood by those skilled in the art that various modifications, combinations, sub-combinations and alterations may occur depending on design requirements and other factors insofar as they are within the scope of the appended claims or the equivalents thereof.

For example, in the above-described embodiment, a case in which the touch state of the operating tool M is detected with use of the optical touch sensor is described. However, the sensor may be an electrical capacitance sensor, a pressure sensor or any other touch sensor.

Besides, in the above-described embodiment, a case in which the pointing direction of the operating tool M is detected based on the touch state of the operating tool M is described. However, the pointing direction of the operating tool M may be detected from the touch state and proximity state of the operating tool M. In this case, for example, the sensor image as an output result of the touch/proximity sensor is processed into three-digit value to specify the touch area, proximity area and non-touch proximity area of the operating tool M. Then, the center-of-gravity positions of the proximity area and the touch area are used as a basis to detect the direction toward the center of gravity in the touch area from the center of gravity of the proximity area as a pointing direction of the operating tool M.

The present application contains subject matter related to that disclosed in Japanese Priority Patent Application JP 2009-158153 filed in the Japan Patent Office on Jul. 2, 2009, the entire content of which is hereby incorporated by reference.

What is claimed is:

1. An information processing apparatus comprising:
   a machine comprising a display panel, wherein the machine is configured to act as:
      an operating tool detector to detect a touch state of an operating tool with the display panel, wherein the touch state concerns interaction with an object displayed on the display panel;
      a display controller to, in response to the operating tool detector detecting a first rotation of the operating tool away from a first pointing direction to a second pointing direction by at least a predetermined angle, control the display panel to display an operation menu in a graphical interface comprising one or more selectable operation items for the object displayed on the display; and
      an operation item selecting portion to, in response to the operating tool detector detecting a second rotation of the operating tool away from the second pointing direction to a third pointing direction, select one of the selectable operating items from the operation menu based at least in part on the third pointing direction.

2. The information processing apparatus according to claim 1, wherein:
   the operation item selecting portion is configured to select an operation item displayed in the operation menu at a position on a line extending in the third pointing direction.

3. The information processing apparatus according to claim 1, wherein:
   the operation item selecting portion is configured to, in response to the operating tool detector detecting the second rotation, select an operation item displayed in the operation menu at a position on a line extending from a fourth pointing direction defined by a change amount obtained by multiplying the amount of change in the pointing direction of the operating tool from the second pointing direction to the third pointing direction by a coefficient a, the coefficient a being larger than 1.

4. The information processing apparatus according to claim 3, wherein:
   the display controller is configured to, in response to the operating tool detector detecting the second rotation, control the display panel to rotate the selectable operation items of the operation menu by a change amount obtained by multiplying the amount of the change in the pointing direction of the operating tool from the second pointing direction to the third pointing direction by a coefficient (1−a).

5. The information processing apparatus according to claim 1, wherein:
   the machine is further configured to, in response to the operating tool detector detecting a non-touch state of the operating tool at a time that the operation menu is displayed in response to the second rotation, execute the operation item selected by the operation item selecting portion.

6. The information processing apparatus according to claim 1, wherein:
   the display controller is further configured to, in response to the operating tool detector detecting movement of the operating tool a predetermined distance or more, stop display of the operation menu.

7. An method for facilitating display of a menu and selection of menu items on a touch screen interface, comprising:
   detecting a touch state of an operating tool with a display panel, wherein the touch state concerns interaction with an object displayed on the display panel;
   in response to detecting a first rotation of the operating tool away from a first pointing direction to a second pointing direction by at least a predetermined angle, controlling the display panel to display an operation menu in a graphical interface comprising one or more selectable operation items for the object displayed on the display panel; and
   in response detecting a second rotation of the operating tool away from the second pointing direction to a third pointing direction, selecting one of the selectable operating items from the operation menu based at least in part on the third pointing direction.

8. The information processing method of claim 7, further comprising:
   selecting one of the operation items from the operation menu based at least in part on an amount of the change in pointing direction from the second pointing direction to a third pointing direction, wherein the third pointing direction is between the first and second pointing directions.

* * * * *